(12) United States Patent
Nagayoshi et al.

(10) Patent No.: US 7,940,351 B2
(45) Date of Patent: May 10, 2011

(54) IMAGE DISPLAY APPARATUS

(75) Inventors: Mayumi Nagayoshi, Chofu (JP);
Satoshi Ouchi, Kamakura (JP); Seiji Murata, Yokohama (JP); Yasutaka Tsuru, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 166 days.

(21) Appl. No.: 12/230,726

(22) Filed: Sep. 4, 2008

(65) Prior Publication Data
US 2009/0059125 A1 Mar. 5, 2009

(30) Foreign Application Priority Data

Sep. 5, 2007 (JP) ................................. 2007-229652

(51) Int. Cl.
*G02F 1/1335* (2006.01)
(52) U.S. Cl. ........................................... 349/64; 349/61
(58) Field of Classification Search .................... 349/61, 349/64
See application file for complete search history.

(56) References Cited

U.S. PATENT DOCUMENTS

| | | | | |
|---|---|---|---|---|
| 7,476,015 B2 * | 1/2009 | Arai et al. | ...................... | 362/607 |
| 7,484,874 B2 * | 2/2009 | Lee et al. | ...................... | 362/607 |
| 7,688,511 B2 * | 3/2010 | Komatsu et al. | .............. | 359/566 |
| 2002/0109805 A1 * | 8/2002 | Baba | ............................... | 349/65 |
| 2004/0075897 A1 * | 4/2004 | Ookawa et al. | ............... | 359/455 |
| 2004/0174717 A1 | 9/2004 | Adachi et al. | | |
| 2004/0264911 A1 * | 12/2004 | Toeda et al. | ................... | 385/146 |
| 2005/0269560 A1 * | 12/2005 | Oku | ................................ | 257/13 |
| 2006/0209562 A1 * | 9/2006 | Lee et al. | ....................... | 362/606 |
| 2007/0211342 A1 * | 9/2007 | Komatsu et al. | .............. | 359/566 |
| 2007/0229729 A1 * | 10/2007 | Nishiyama et al. | ............. | 349/62 |
| 2008/0014995 A1 * | 1/2008 | Noba | ............................ | 455/566 |
| 2009/0040789 A1 * | 2/2009 | Maeda et al. | .................. | 362/625 |

FOREIGN PATENT DOCUMENTS

| | | |
|---|---|---|
| CN | 1431540 | 7/2003 |
| CN | 1987603 | 6/2007 |
| JP | 2004-272055 | 9/2004 |
| JP | 2004-311353 | 11/2004 |

\* cited by examiner

*Primary Examiner* — K. Cyrus Kianni
(74) *Attorney, Agent, or Firm* — Antonelli, Terry, Stout & Kraus, LLP.

(57) ABSTRACT

An image display apparatus includes: a plurality of light sources for emitting light; an optical uniformizing portion for uniformizing light emitted from the plurality of light sources; a total reflection portion disposed above the plurality of light sources, the total reflection portion totally reflecting light from the optical uniformizing portion; an optical guide portion for guiding light totally reflected at the total reflection portion; an optical diffusion unit for diffusing light from the total reflection portion and outputting the diffused light; an optical parallelizing unit for parallelizing light from the optical diffusion unit; and a liquid crystal panel for modulating light from the optical parallelizing unit into an optical image in accordance with an image signal and displaying the optical image.

15 Claims, 10 Drawing Sheets

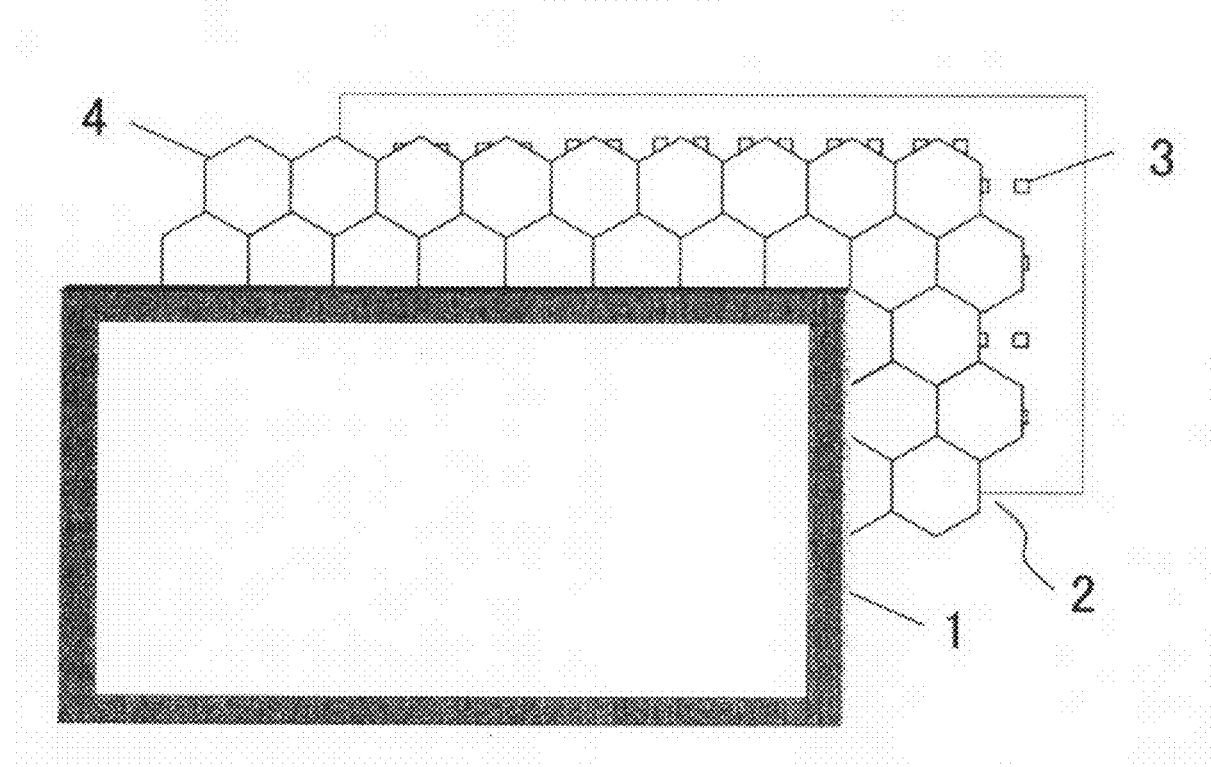

IMAGE DISPLAY APPARATUS

INCORPORATION BY REFERENCE

The present application claims priority from Japanese application JP07-229652 filed on Sep. 5, 2007, the content of which is hereby incorporated by reference into this application.

BACKGROUND OF THE INVENTION

The present invention relates to an image display apparatus using a liquid crystal display device, and more particularly to improvements on a backlight unit for radiating light to the liquid crystal display device.

JP-A-2004-272055 discloses a side light type surface light source apparatus having an optical guide plate and an LED light source for radiating light to the optical guide plate, the optical guide plate having an arc-shaped light incidence concave portion in which the LED light source is accommodated. The optical guide plate has a generally trapezoidal shape increasing its width along a direction moving away from the side where the light incidence concave portion is formed, and a light emission plane on the side opposing the light incidence concave portion, and an optical diffusion unit is selectively disposed on the light emission plane. JP-A-2004-272055 discloses also the structure that a prism plane 13 as the optical diffusion unit is formed in a first area 15 of the light emission plane 14 of the optical guide plate and flat planes 18 and 19 are formed in second areas 16 and 17 in order to make different the degrees of transmission and scattering of emission light in each area.

SUMMARY OF THE INVENTION

In the light source apparatus of JP-A-2004-272055, light is transmitted through or reflected at the optical diffusion unit disposed on the whole optical emission plane of the optical guide plate. Therefore, light having a high luminance emitted from the LED light source becomes incident upon an area of the optical diffusion unit just above the LED light source, so that it is difficult to display an image having a uniform luminance on the whole side light plane.

Also, in the light source apparatus of JP-A-2004-272055, since the optical guide plate has a generally trapezoidal shape increasing its width along a direction moving away from the side where the light incidence concave portion is formed, it is difficult to thin the apparatus.

The present invention has been made in consideration of the above-described issue, and its object is to provide an image display apparatus capable of being thinned.

In order to solve the above-described problem, the apparatus is structured, for example, in the manner described in the appended claims.

It becomes possible to make uniform the luminance of a displayed image and thin the apparatus.

Other objects, features and advantages of the invention will become apparent from the following description of the embodiments of the invention taken in conjunction with the accompanying drawings.

BRIEF DESCRIPTION OF THE DRAWINGS

FIG. 1 is a schematic diagram of a liquid crystal television.

DETAILED DESCRIPTION OF THE EMBODIMENTS

Embodiments will now be described with reference to the accompanying drawings. In each drawing, elements having the same functions are represented by using identical symbols, and the description once made is not duplicated but omitted.

FIG. 1 is a schematic diagram of a liquid crystal television using a backlight unit. The backlight unit of a liquid crystal television is constituted of a liquid crystal panel 1 and an optical unit 2. The optical unit 2 is constituted of light sources 3 disposed on a substrate and optical elements disposed above upper surfaces of the light sources 3. The optical elements 4 may be formed as a single sheet to which the optical elements are bonded, or may be disposed independently.

Figure 2A:
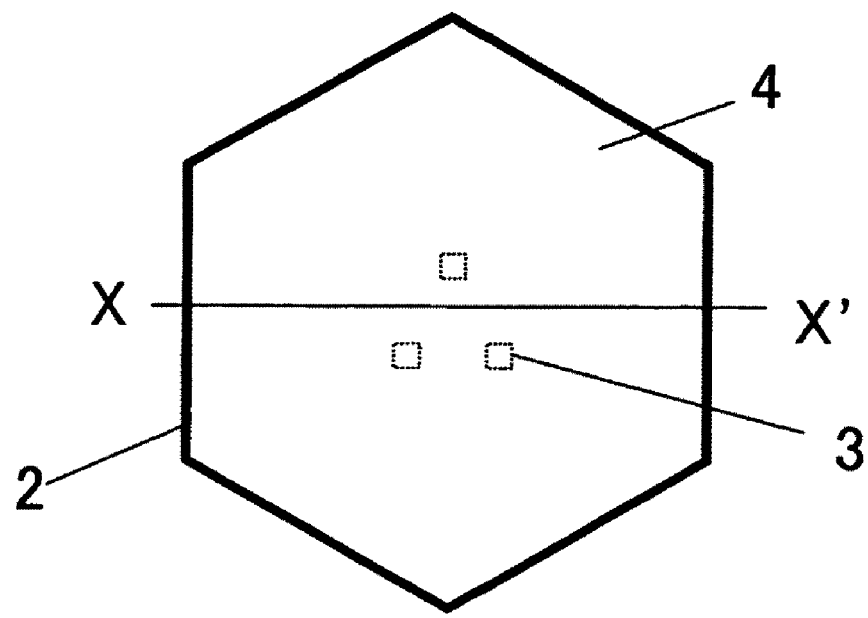
FIGS. 2A and 2B are plan views of optical units 2.
Figure 2B:
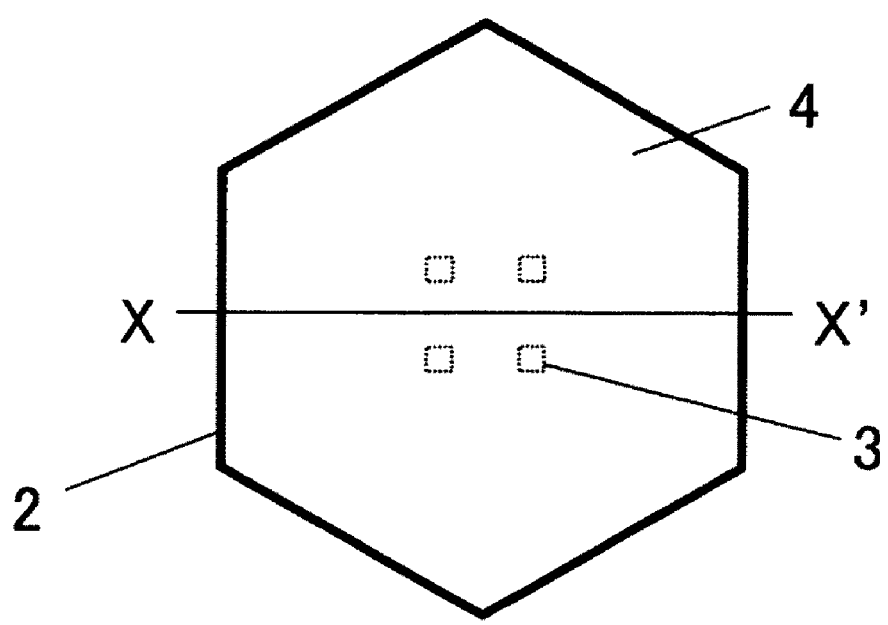

FIGS. 2A and 2B are plan views of the optical units 2. In embodiments, the light sources 3 are, for example, LED light sources or laser light sources. The light source may be a chromatic light source of, e.g., red (R), green (G), blue (B) or yellow (Y), or a light source of white (W). For example, if three light sources of R, G and B are used, the light sources 3 are disposed in a triangular shape as shown in FIG. 2A, or if four light sources of R, G, B and Y, or R, $G_1$, $G_2$ and B are used, the light sources 3 are disposed in a rectangular shape as shown in FIG. 2B. By using a plurality of light sources, it becomes possible to expand a color reproduction range and obtain a high quality image. In the embodiments to be described below, although three or four light sources are used, the number of light sources 3 to be used is not limited thereto. The optical element 4 is made of PMMA, ZEONOR®, OZ, polycarbonate, glass, silicon or the like.

Figure 3A:
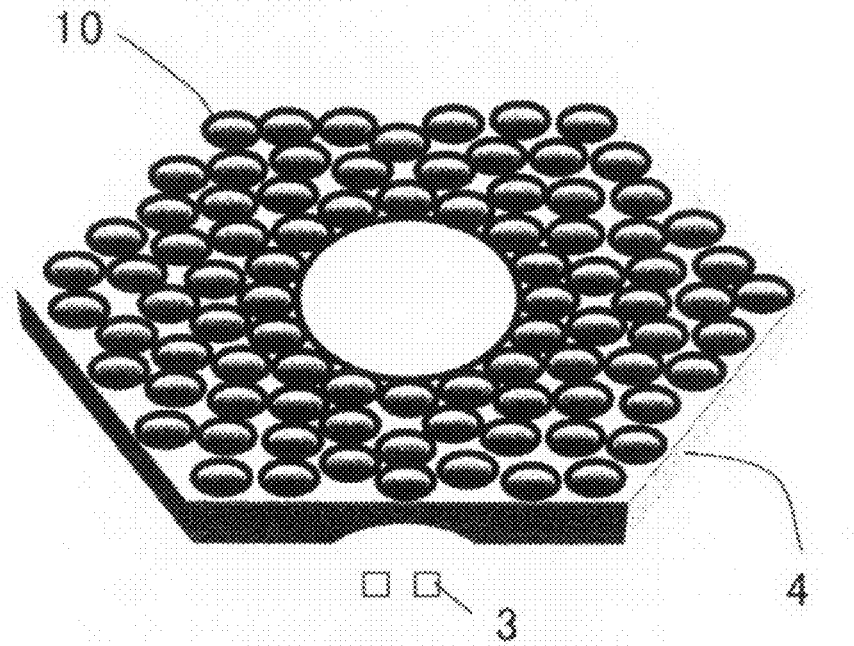
FIGS. 3A and 3B are top views of optical elements 4.
Figure 3B:
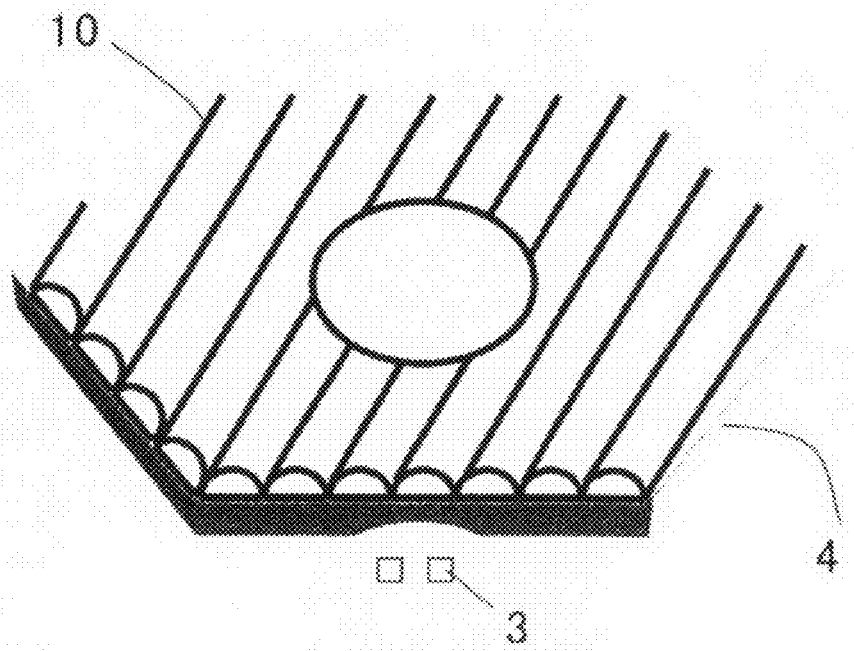

FIGS. 3A and 3B are diagrams showing parallelizing units 10 disposed on a plane of the optical element 4 facing the liquid crystal panel 1. For example, the parallelizing unit 10 is constituted of a plurality of lenses for parallelizing light beams, such as a lens array shown in FIG. 3A. The parallelizing unit 10 may be constituted of lenticular lenses such as shown in FIG. 3B. The parallelizing unit 10 parallelizes light relative to the liquid crystal panel 1 and makes light be incident upon the liquid panel approximately vertically, so that a high luminance image can be displayed.

Figure 4:
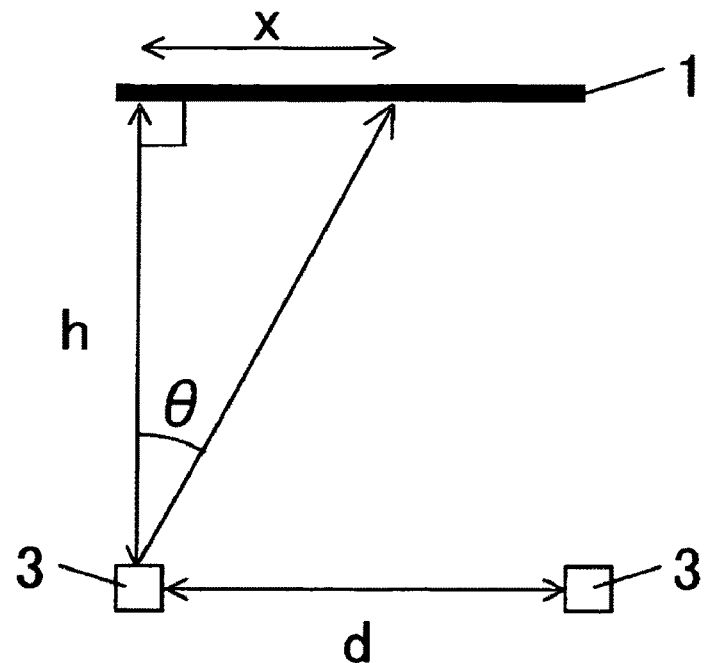
FIG. 4 is a diagram showing a positional relation between a liquid crystal panel 1 and a light source 3.
Figure 5:
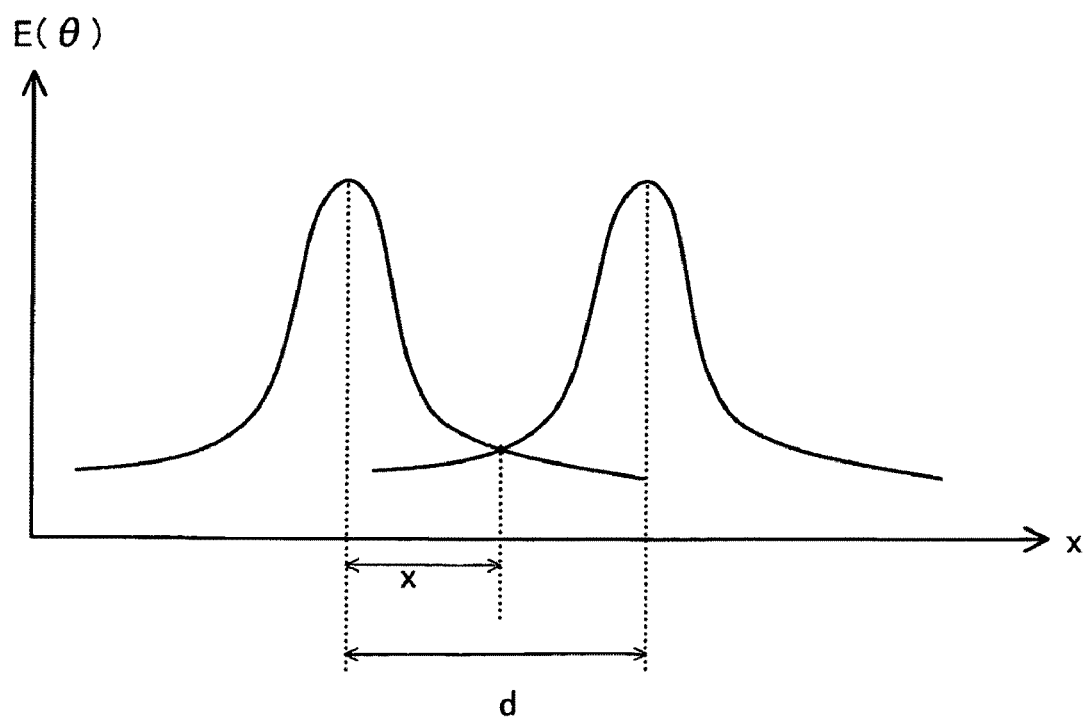
FIG. 5 is a diagram showing an energy distribution of light emitted from two light sources 3 juxtaposed.

FIG. 4 is a diagram showing a positional relation between the liquid crystal panel 1 and a light source 3, and FIG. 5 is a diagram showing energy distributions of light emitted from two light sources 3 juxtaposed. As shown in FIG. 4, an emission angle of the light source 3 is represented by θ, a perpendicular length from the light source 3 to the liquid crystal panel 1 is represented by h, a distance between the adjacent light sources 3 is represented by d, and the half of the distance between adjacent light sources is represented by x. FIG. 5 shows energy distributions of light emitted from two juxtaposed light sources, as approximated by the $\cos^4\theta$ rule. The following formulas (1), (2), (3) and (6) are therefore satisfied:

$$E(\theta)=E_0 \cos^4\theta \tag{1}$$

$$x=h \tan \theta \tag{2}$$

$$d=2x \tag{3}$$

$$\cos^2\theta=1/(1+\tan^2\theta) \tag{6}$$

Figure 6:
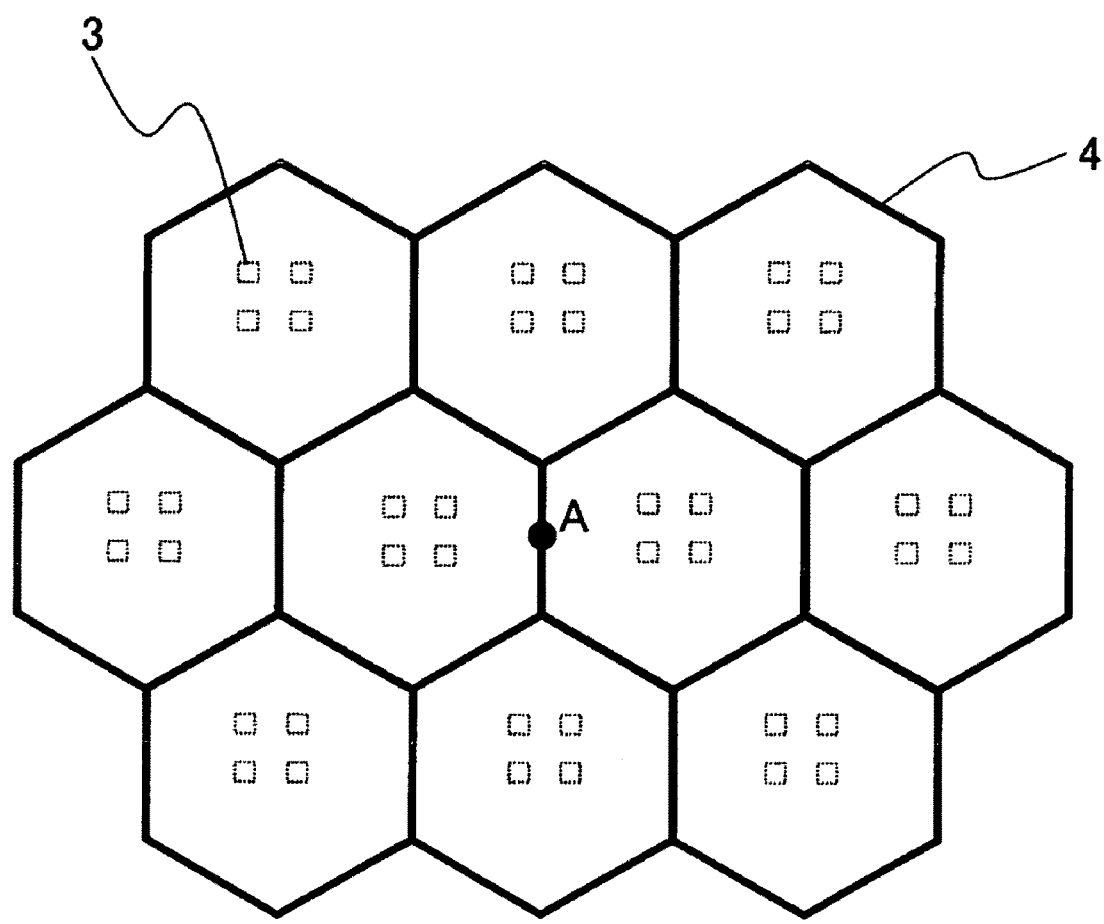
FIG. 6 is a diagram showing a plurality of optical elements 4 disposed in a hound's tooth check shape.

If $h \leq 20$, $d \geq h/0.58$ stands when a luminance variation is measured at a point A having a distance x from the light source 3, for example, by disposing a plurality of optical elements 4 having light sources 3 in a hound's tooth check shape as shown in FIG. 6. The reason for this will be described below.

It is ensured from our experiments that luminance can be made uniform at d=12 mm and h=25 mm without using the optical elements 4. However, if $h \leq 20$, it is difficult to make uniform the luminance by using only the light sources 3, because the influence of direct light from each light source 3 becomes great and a peak appears. Therefore, in order to make uniform the luminance at $h \leq 20$, it is necessary to define a relationship between h and d. Assuming that ten optical elements 4 of a regular hexagon shape contribute to the point A as shown in FIG. 6, it can be known from the formulas (1), (2) (6) and FIG. 4 that the following formula (4) stands.

$$\frac{E_0 h^4}{((\sqrt{3}x)^2+h^2)^2} \times 2 + \frac{E_0 h^4}{((\sqrt{7}x)^2+h^2)^2} \times 4 + \frac{E_0 h^4}{(x^2+h^2)^2} \times 2 + \frac{E_0 h^4}{((3x)^2+h^2)^2} \times 2 = E_0 \tag{4}$$

It can be known from the formula (4) that the following formula (5) is satisfied.

$$d=h/0.58 \tag{5}$$

It can be understood from these points that if luminance distributions of light emitted from the light sources 3 are superposed one upon another, a luminance at a darkest point between adjacent light sources 3 becomes equal to a peak luminance. It is therefore possible to thin the image display apparatus and make uniform the luminance of a displayed image.

An optical film, an optical sheet, a prism sheet or the like having optical diffusion characteristics may be disposed between the light sources 3 and a light exposure plane of the liquid crystal panel 1. Specific embodiments of the image display apparatus will be described on the basis of the above-described points.

First Embodiment

The first embodiment will be described with reference to FIG. 7.

Figure 7:
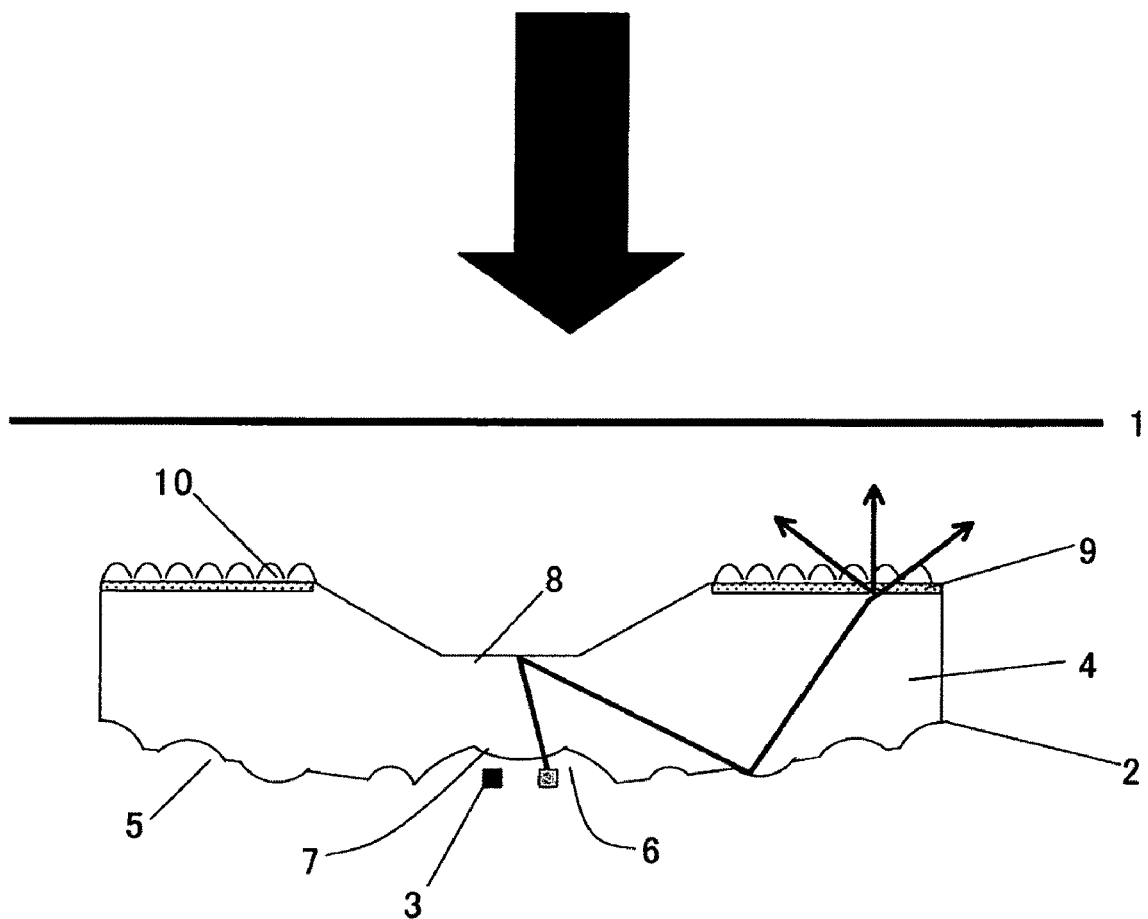
FIG. 7 is a diagram showing an image display apparatus according to a first embodiment.

FIG. 7 is a cross sectional view taken along line X-X' shown in FIGS. 2A and 2B. Referring to FIG. 7, an image display apparatus is constituted of a liquid crystal panel 1, an optical unit 2, light sources 3 for radiating light, an optical element 4, an optical guide portion 5, a light source concave recess 6, an optical uniformizing portion 7, a total reflection portion 8, a first optical diffusion unit 9 and a parallelizing unit 10.

Referring to FIG. 7, the total reflection portion 8 is disposed above the light sources 3, and the first optical diffusion unit 9 is disposed at a position nearer to the liquid crystal panel 1 than the total reflection portion 8. In FIG. 7, the liquid crystal panel 1, parallelizing unit 10, first optical diffusion unit 9, total reflection portion 8, optical guide portion 5 and light sources 3 are disposed in this order as viewed from an image viewing side (along an arrow direction). Since the total reflection portion 8 has a recess which is concave toward the light source 3 side, light reflected at the total reflection portion 8 is distributed to the whole area of the optical guide portion 5, so that a displayed image can be uniformized.

Light emitted from the light source 3 is uniformized by the optical uniformizing portion 7, and becomes incident upon the optical element 4. The light incident upon the optical element 4 is reflected at the total reflection portion 8 and guided in the optical guide portion 5. Light reflected at the optical guide portion 5 is diffused by the first optical diffusion unit 9, parallelized at the parallelizing unit 10, and becomes incident upon the liquid crystal panel 1.

In FIG. 7, the light source 3 can be installed stably by providing the light source concave recess 6 of a hemisphere shape and installing the light source 3 in non-contact with the optical element 4. Since the light source concave recess 6 is formed into the hemisphere shape, light emitted from the light source can be made incident upon the optical element 4 without refraction so that a light usage efficiency can be improved.

Also in FIG. 7, if there is an error or displacement of a position where the light source 3 is installed during manufacture of the image display apparatus, the optical uniformizing portion 7 corrects an optical axis of the light source 3 so as to align the optical axis with the center axis of the optical element 4. It is therefore possible to reduce luminance variation and color variation of a displayed image.

Further in FIG. 7, the optical uniformizing portion 7 is made of one cone or truncated cone or a plurality of cones or truncated cones having different radiuses and superposed one upon another. If the total reflection portion 8 has a flat plane as shown in FIG. 7, the optical diffusion unit, a reflection unit and an optical shielding unit may be disposed on the total reflection portion 8. Light reflected at the total reflection unit becomes incident upon the optical guide portion 5 made of a toroid, a lens, a prism, a diffraction grating or the like, is reflected and diffused in a plurality of directions in the optical guide portion 5, spread in the optical element and made incident upon the first optical diffusion unit 9.

In FIG. 7, the first optical diffusion unit 9 is made of a plurality of particles having different sizes and buried in the optical element 4, and has an optical transmissivity of 30 to 100%. Light from the optical element 4 is diffused by the first optical diffusion unit 9 so that the luminance of a displayed image can be uniformized.

Light output from the first optical diffusion unit 9 becomes incident upon the optical parallelizing unit 10 which corrects a light angle so as to make light be incident upon the plane of the liquid crystal panel 1 along a vertical direction. It is therefore possible to obtain an image of high luminance and high quality as observed externally from the liquid crystal panel 1.

In the first embodiment, although the first optical diffusion unit 9 is formed being buried in the optical element 4, the first optical diffusion unit 9 may be formed on the upper surface of the optical element 4, and the optical parallelizing unit 10 is formed on the first optical diffusion unit. In this case, the amount of light incident upon the liquid crystal panel 1 can be increased and the luminance can be made uniform.

Figure 11:
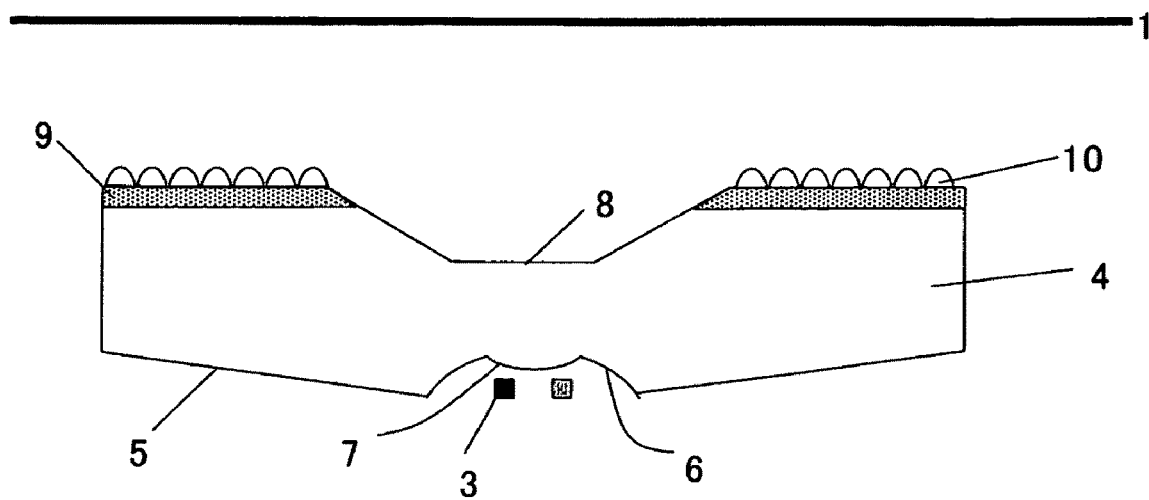
FIG. 11 is a diagram showing an image display apparatus according to a modification of the first embodiment.
Figure 12:
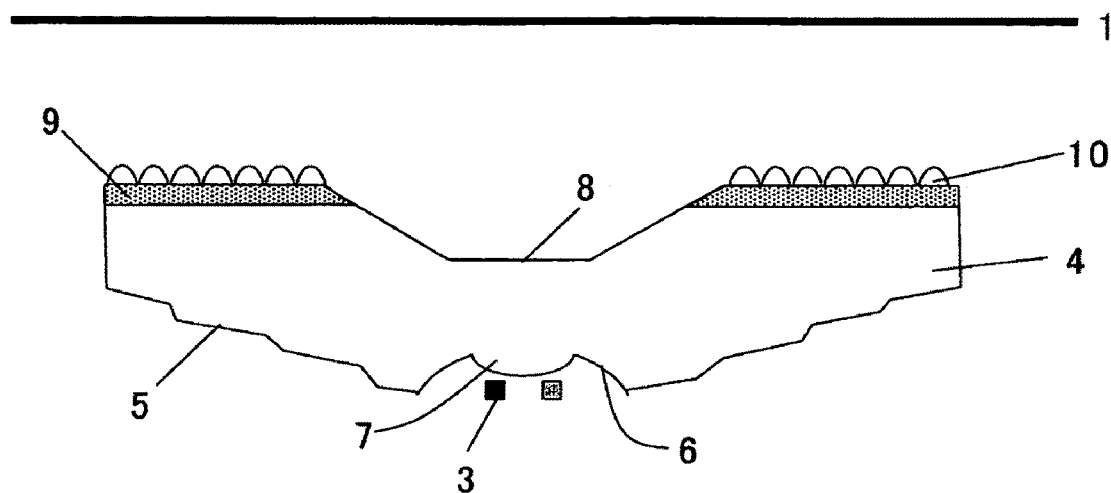
FIG. 12 is a diagram showing an image display apparatus according to another modification of the first embodiment.
Figure 13:
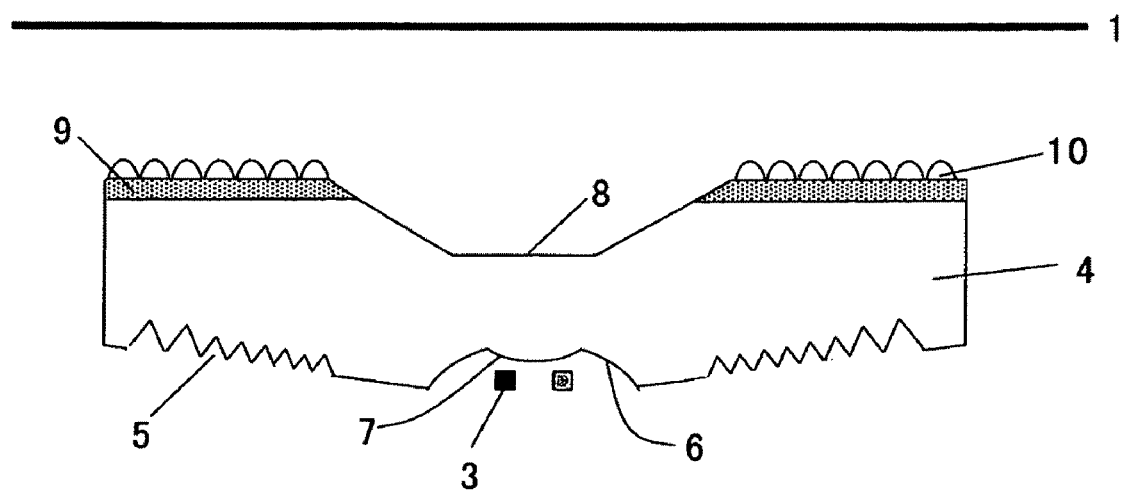
FIG. 13 is a diagram showing an image display apparatus according to still another modification of the first embodiment.

Also in the first embodiment, the optical guide portion 5 may have a plan shape as shown in FIG. 11, or a concentric prism shape as viewed from the vertical direction with respect to the liquid crystal panel 1 (from below on the page). In the latter case, its cross-sectional shape is a step form as shown in FIG. 12. Also, it may be made of a plurality of prisms as shown in FIG. 13.

Second Embodiment

Figure 8:
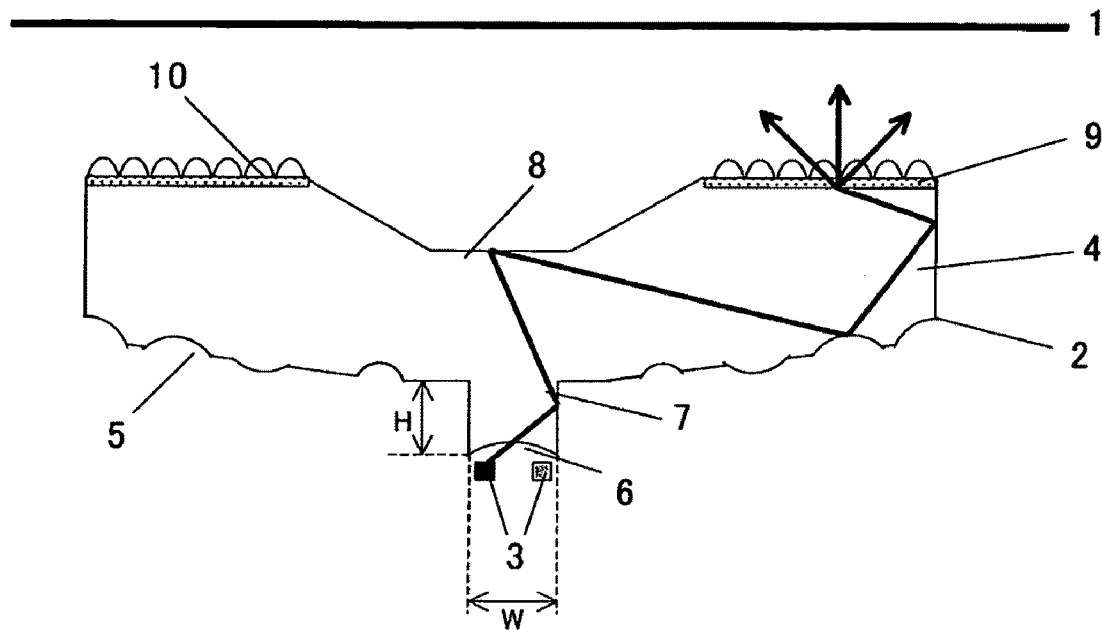
FIG. 8 is a diagram showing an image display apparatus according to a second embodiment.

FIG. 8 is a cross sectional view taken along line X-X' shown in FIGS. 2A and 2B similar to FIG. 7, and showing the image display apparatus of a second embodiment. In the second embodiment, description of the same components as those of the first embodiment is omitted for simplicity.

A different point of the second embodiment from the first embodiment resides in that the optical uniformizing portion 7 is made of a light pipe of a circular cylinder or a rectangular cylinder. Other components are similar to those of the first embodiment.

The light pipe as the optical uniformizing portion 7 is made of optical resin or the like. By forming the bottom surface of the light pipe of the optical uniformizing portion 7 so as to have a concave lens shape, a light usage efficiency can be improved similarly to the first embodiment. By making parallel the opposite ends of the light pipe as the optical uniformizing portion 7, return light to the light source 3 can be prevented.

If a plurality of monochromatic light sources having different colors such as a R light source, a G light source and a B light source are used as the light sources 3, an efficient reflection of light emitted from these light sources and a mixing of colors can be realized by setting W≈H where W is the width and H is the length, respectively of the optical uniformizing portion 7. If W>H is set in order to further thin the image display apparatus, it is necessary to reflect light by forming a reflection film of aluminum on the side wall of the optical uniformizing portion 7.

Third Embodiment

Figure 9:
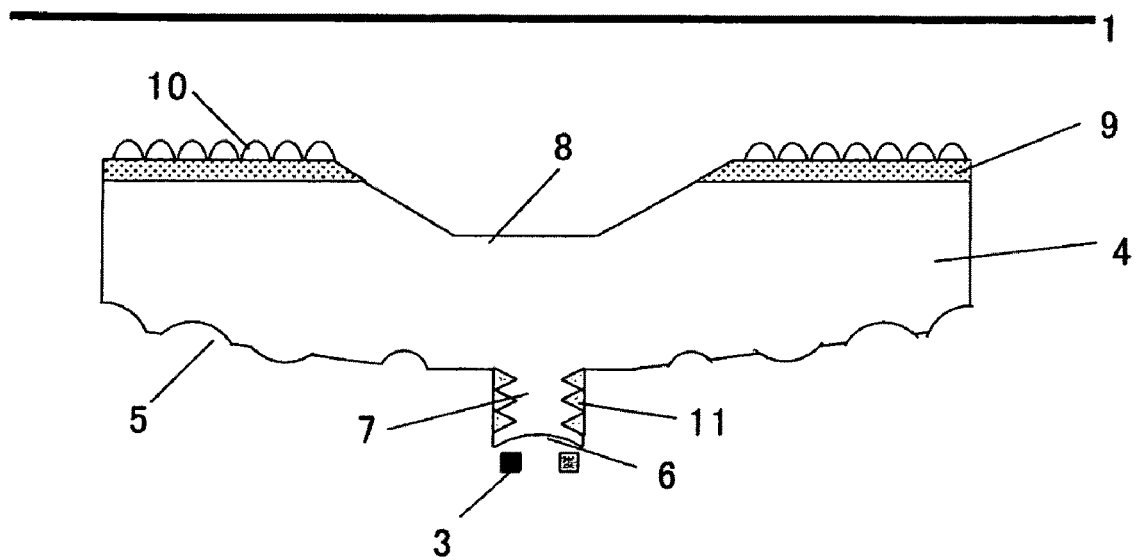
FIG. 9 is a diagram showing an image display apparatus according to a third embodiment.

FIG. 9 is a cross sectional view taken along line X-X' shown in FIGS. 2A and 2B similar to FIG. 7, and showing the image display apparatus of a third embodiment. In the third embodiment, description of the same components as those of the second embodiment is omitted for simplicity.

A different point of the third embodiment from the second embodiment resides in that a second optical diffusion unit 11 for diffusing light is disposed inside the light pipe as the optical uniformizing portion 7. Other components are similar to those of the second embodiment. If a plurality of monochromatic light sources having different colors such as a R light source, a G light source and a B light source are used as the light sources 3, it is necessary to efficiently reflect light emitted from these light sources and uniformly mix colors. By providing the second optical diffusion unit 11 for diffusing light inside the light pipe, light from the light source can be diffused by the first optical diffusion unit 9 and second optical diffusion unit 11 so that light can further be uniformized and color variation of a displayed image can be reduced.

Fourth Embodiment

Figure 10:
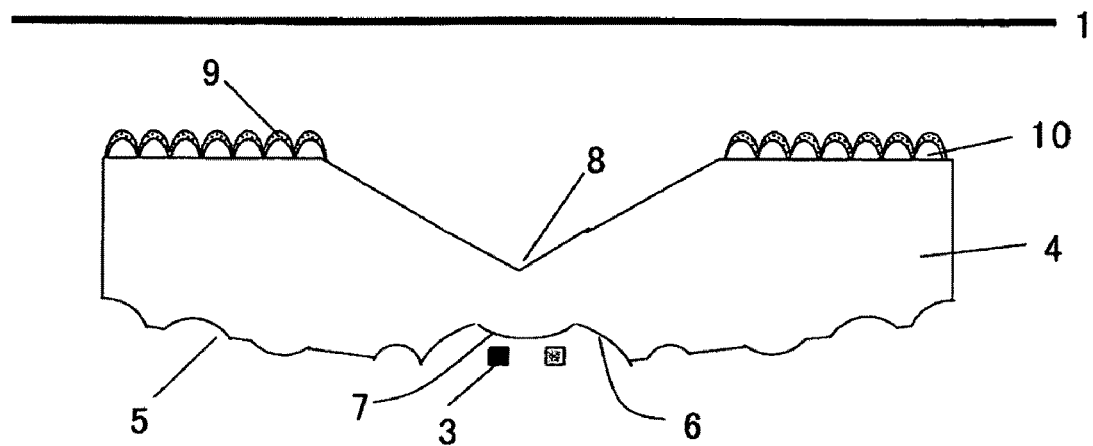
FIG. 10 is a diagram showing an image display apparatus according to a fourth embodiment.

FIG. 10 is a cross sectional view taken along line X-X' shown in FIGS. 2A and 2B similar to FIG. 7, and showing the image display apparatus of a fourth embodiment. In the fourth embodiment, description of the same components as those of the first embodiment is omitted for simplicity, similar to the third embodiment.

A different point of the fourth embodiment from the first embodiment resides in that a front tip of the total reflection portion 8 is made sharp toward the light source 3, the optical parallelizing unit 10 is made of lenticular lenses, and the upper surface of the optical parallelizing unit 10 is coated with a film serving as the first optical diffusion unit 9.

By making sharp the front tip of the total reflection portion 8, it becomes possible to make light from the light source 3 become uniformly incident upon the front surface of the optical guide portion 5 so that the luminance of a displayed image can be uniformized.

Fifth Embodiment

Figure 14:
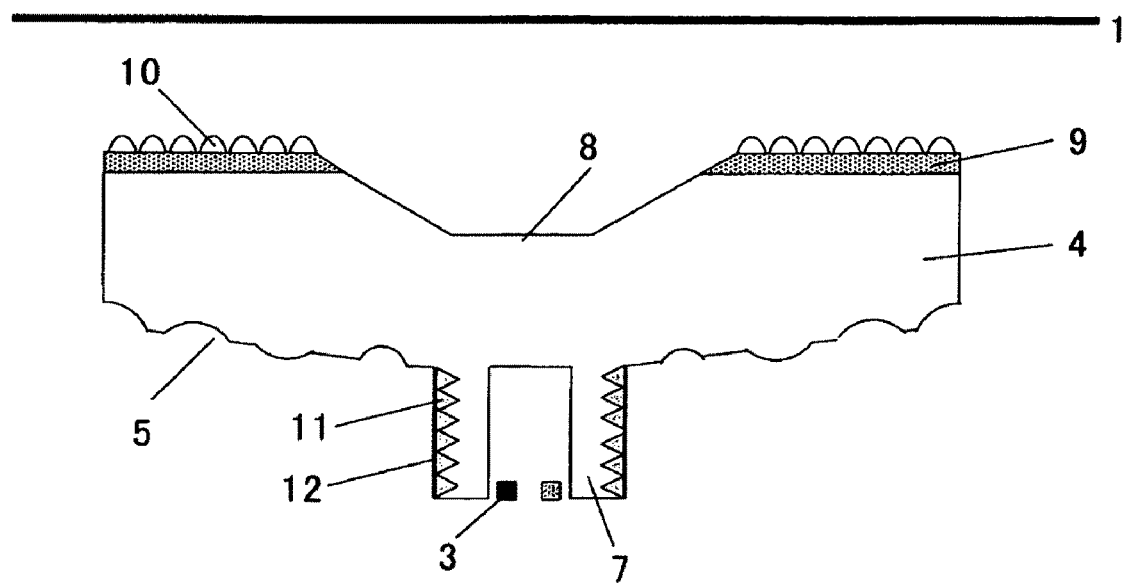
FIG. 14 is a diagram showing an image display apparatus according to a fifth embodiment.
Figure 15:
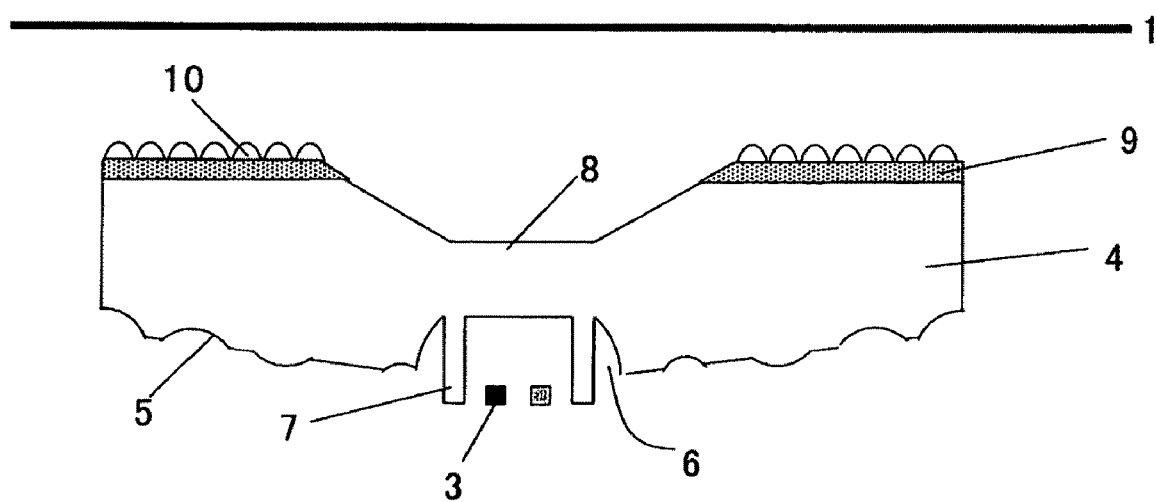
FIG. 15 is a diagram showing an image display apparatus according to a modification of the fifth embodiment.

FIG. 14 is a cross sectional view taken along line X-X' shown in FIGS. 2A and 2B similar to FIG. 7, and showing the image display apparatus of a fifth embodiment. In the fifth embodiment, description of the same components as those of the first embodiment is omitted for simplicity, similar to the fourth embodiment.

A different point from the first embodiment resides in that a cavity is formed inside the optical uniformizing portion 7, a reflection film 12 is provided on the side wall of the optical uniformizing portion 7, and light sources 3 are disposed inside the cavity of the optical uniformizing portion 7.

It is needless to say that similar effects can also be obtained even if the optical uniformizing portion 7 is formed inside the light source concave recess 6.

Although not shown, if a point light source for emitting light in a 360° direction is used as the light source, a reflection mirror is disposed on the bottom of the optical uniformizing portion 7 to reflect light propagating in an opposite direction to the liquid crystal panel 1 so as to propagate the light toward the liquid crystal display panel 1. In this manner, a light usage efficiency can be improved.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image display apparatus comprising:
a plurality of light sources for emitting light;
an optical uniformizing portion for uniformizing light emitted from said plurality of light sources;
a total reflection portion disposed above said plurality of light sources, said total reflection portion totally reflecting light from said optical uniformizing portion;
an optical guide portion for guiding light totally reflected at said total reflection portion;
an optical diffusion unit for diffusing light from said total reflection portion and outputting the diffused light;
an optical parallelizing unit for parallelizing light from said optical diffusion unit; and a liquid crystal panel for modulating light from said optical parallelizing unit into an optical image in accordance with an image signal and displaying the optical image;

wherein said optical uniformizing portion is a light pipe, and a length and a width of said light pipe are approximately equal.

2. The image display apparatus according to claim 1, wherein said liquid crystal panel, said optical parallelizing unit said optical diffusion unit, said total reflection portion, said optical guide portion, said optical uniformizing portion, and said plurality of light sources, are disposed in this order from an image viewing side.

3. The image display apparatus according to claim 2, wherein said total reflection portion has a concave shape toward said light sources.

4. The image display apparatus according to claim 2, wherein said optical parallelizing unit is made of a plurality of lens arrays or lenticular lenses.

5. The image display apparatus according to claim 2, wherein said optical uniformizing portion is a light pipe, and a length and a width of said light pipe are approximately equal.

6. The image display apparatus according to claim 5, wherein said plurality of light sources are a plurality of light sources having different colors, and a second optical diffusion unit for diffusing light from said light sources is disposed on a side wall of said light pipe.

7. The image display apparatus according to claim 6, wherein said plurality of light sources are disposed in a cavity of said optical uniformizing portion.

8. The image display apparatus according to claim 7, wherein a reflection mirror is disposed on a bottom surface of said optical guide portion.

9. The image display apparatus according to claim 2, wherein a relationship is satisfied that $d \geq h/0.58$ if $h \leq 20$ mm, where h is a distance between said liquid crystal panel and any one of said plurality of light sources and d is a distance between each of said plurality of light sources.

10. The image display apparatus according to claim 1, wherein said total reflection portion has a concave shape toward a side of said plurality of light sources.

11. The image display apparatus according to claim 1, wherein said optical parallelizing unit is made of a plurality of lens arrays or lenticular lenses.

12. The image display apparatus according to claim 1, wherein said plurality of light sources are a plurality of light sources having different colors, and a second optical diffusion unit for diffusing light from said light sources is disposed on a side wall of said light pipe.

13. The image display apparatus according to claim 12, wherein said plurality of light sources are disposed in a cavity of said optical uniformizing portion.

14. The image display apparatus according to claim 13, wherein a reflection mirror is disposed on a bottom surface of said optical guide portion.

15. The image display apparatus according to claim 1, wherein a relationship is satisfied that $d \geq h/0.58$ if $h \leq 20$ mm, where h is a distance between said liquid crystal panel and any one of said plurality of light sources and d is a distance between each of said plurality of light sources.

* * * * *